United States Patent [19]
Brown

[11] Patent Number: 5,387,074
[45] Date of Patent: Feb. 7, 1995

[54] PIANO LIFT AND DOLLY

[76] Inventor: Jeffrey R. Brown, 16717 Shea La., Gaithersburg, Md. 20877

[21] Appl. No.: 42,638

[22] Filed: Apr. 5, 1993

[51] Int. Cl.$^6$ ............................................... B66F 5/04
[52] U.S. Cl. .................................. 414/589; 254/2 R; 280/79.11
[58] Field of Search ............... 414/589; 254/2 R, 2 B, 254/2 C, 134; 280/79.11, 79.3

[56] References Cited

U.S. PATENT DOCUMENTS

| | | |
|---|---|---|
| 2,463,381 | 8/1944 | Hicks . |
| 2,751,191 | 7/1953 | Schroeder . |
| 2,904,308 | 9/1959 | Vergara ........................... 254/134 X |
| 3,524,556 | 8/1970 | Miller ................................... 414/589 |
| 3,829,063 | 8/1974 | Holzworth . |
| 3,830,456 | 8/1974 | Fletcher . |
| 3,851,857 | 12/1974 | Notgrass ............................ 254/134 |
| 3,949,976 | 4/1976 | Cofer ................................. 254/28 X |
| 4,123,038 | 10/1978 | Meyers . |
| 4,331,324 | 5/1982 | Andary . |
| 4,475,714 | 10/1984 | Heiskell et al. . |
| 4,625,944 | 12/1986 | Mankey et al. . |

FOREIGN PATENT DOCUMENTS

| | | |
|---|---|---|
| 323921 | 1/1929 | United Kingdom . |
| 2172855 | 10/1986 | United Kingdom . |

Primary Examiner—Donald W. Underwood

[57] ABSTRACT

A piano lift and dolly has an upper H-frame that engages a piano and a lower H-frame that is supported on wheels. Four posts extend vertically upwardly from the lower H-frame and are received in downwardly extending tubes connected to the upper H-frame. A jack has its base mounted on a cross beam of the lower H-frame and its jack RAM mounted directly to a center point of the cross beam of the upper H-frame. Two beams of the upper H-frame engage the underside of the piano at different heights with respect to a floor on which the dolly is supported. As the jack is raised, the RAM raises the upper H-frame with respect to the lower one to lift a piano off of the floor. In this way, the piano is moved without the legs of the piano engaging the floor.

4 Claims, 3 Drawing Sheets

PIANO LIFT AND DOLLY

BACKGROUND OF THE INVENTION

1. Field of the Invention

The invention relates to a piano lift and dolly for moving a grand piano, such as a full grand or baby grand piano. The dolly and lift slide under the piano and raise the piano off of the floor a sufficient distance to permit it to be moved around on the dolly.

2. Description of Related Art

A grand piano weighs approximately 1,000 pounds. They have three legs with wheels for each of the legs. This permits the piano to be moved around on smooth surface floors. Although the piano can be moved across smooth floors on thee wheels, any crossing over of gaps in the flooring will apply great stress to the legs of the piano. The legs are not designed to withstand such stress and frequently break as a result. Since piano wheels are typically hard surface wheels, made of metal for example, and since they are of a relatively small diameter for aesthetic reasons, a gap in the flooring of $\frac{1}{8}$-$\frac{1}{4}$ inch can create a barrier that cannot be bridged by such wheels. Further, since the fear of breaking a piano leg is so great, the pianos are not generally moved any great distance on the wheels that are provided by the manufacturer, even if only being moved on a storage location to an on-stage site, for example.

One common way to move a grand piano is to set the piano legs on a Colson dolly. A Colson dolly is adjustable, having arms that extend outwardly from a centrally positioned base to which they are pivoted. Each of the arms has a wheel and a foot support at its terminal end for supporting one of the piano legs. When using a Colson dolly, the wheels provided by the manufacturer are removed and the legs rest directly on the feet at the ends of the arms of the dolly. In this manner, the additional height that the keyboard is effectively raised off the floor by the Colson dolly is offset by the lowering in height achieved by removing the wheels.

Despite the usefulness of the Colson dolly, there are disadvantages. First, the piano must be set on the dolly, which requires at least four persons or so to lift the piano. Secondly, the piano must either be unloaded from the dolly once it has been moved or permanently maintained on the dolly. If the piano is to be permanently maintained on the dolly during performances, transit and storage, the dolly is not available for use with other pianos. Therefore, one dolly per piano is required on a permanent basis.

Another problem with permanently maintaining the piano on the Colson dolly is that the dolly is not aesthetically pleasing from an artistic viewpoint. Therefore, the dolly is unsuitable to support a piano on a stage at a theater or the like. Further, although the height of the piano is lowered by removing its wheels and raised again by supporting it on the dolly, the keyboard height is not exactly the same, which bothers some pianists.

An additional problem is presented with the use of Colson dollys. Some artists believe that the piano legs should be in contact with the floor when the piano is played. With use of a Colson dolly, the piano legs rest on foot supports at the ends of the arms of the dolly, and only the wheels of the dolly actually engage the floor. Thus, the legs of the piano do not engage the floor to the dissatisfaction of some artists. Such dissatisfaction rises to the level of being totally unacceptable at times. To overcome this, once the Colson dolly is used to position the piano on a stage, several people must be available to lift the piano off of the dolly to set it on the stage floor.

It is also known to move a piano using a small forklift. The tines of the forklift are positioned under the piano and the piano is raised off the floor. Moving a piano in this manner requires a skilled forklift operator and is inconvenient in many circumstances. Thus, forklifts are not thought to be the best way of moving a grand piano.

SUMMARY OF THE INVENTION

It is an object of the present invention to provide a lift and dolly that can be positioned underneath a piano to raise the piano off the floor and enable the piano to be moved from one place to another by only one person.

One method of moving a piano with only one person is to employ the use of a forklift, as discussed above. The problem with using a forklift in this manner, in addition to the problems discussed above, is that the weight distribution of the piano prevents a balanced support of the piano by the tines of the forklift. Specifically, the weight distribution of a grand piano is shifted toward the keyboard or front of the piano. The keyboard itself is positioned over the keybed that extends along the front of the piano. The front to back center point of gravity must be positioned between the support points during lifting to maintain the piano in a level position. When the forklift tines engage the underside of the piano, the center point is not balanced between the tines and the piano is prone to tilt (from a front to back frame of reference) toward the keyboard, thus making movement of the piano on the forklift slightly precarious. Needless to say, when moving a piano, it is imperative that the piano not be damaged. Pianos are frequently moved just prior to performances in a theater and back-up pianos can be difficult to obtain on short notice if one is damaged. Thus, movement of a piano on a forklift is not the most desirable way in which to move the piano.

According to the present invention, a lifting mechanism is supported on wheels so that once the lifting mechanism raises the feet of the piano off the floor, it becomes the dolly for moving the piano. The wheels preferably have a five or six inch diameter. They are preferably made of molded polypropylene so that the dolly can be moved across gaps in floor surfaces, etc. Furthermore, movement of the piano on the dolly can be accomplished by one person.

The object of the invention is to support the piano by recognizing that the balancing of the center of gravity between the two support points requires one beam of the lifting mechanism to support the piano along the keybed and the other beam(s) of the lifting mechanism to support the piano along the braces along the bottom or underneath the piano. The difference in height or relative downward extension from the bottom of the piano between the keybed and the braces of the piano requires an approximately one inch, preferably 1 1/16", difference in height between the two supporting beams of the lifting mechanism, as shown in FIG. 4. This difference in height cannot be achieved by a forklift, so this method is not employed when lifting a piano using a forklift. Furthermore, this method is thought not to be possible in view of the lyre stick, which extends between the piano pedals and the lyre pillar. As shown in FIG. 4, the lyre stick is connected to the keybed within about 2½ to three inches (on most pianos, such as Steinway and Baldwin grand pianos) of the edge or lip of the keybed.

According to the present invention, it is an object to provide a lifting mechanism with one beam of support that is narrow enough to engage the keybed between the point at which the lyre stick is connected to the keybed and the rearward or edge of the keybed facing the back of the piano. Since the beam must withstand loading of between 500 to 1,000 pounds, the beam must be strong enough to support the weight. Spaced apart from the beam of the lifting mechanism that engages the keybed is one or more additional lifting beams, preferably one, which is vertically lower in height than the first beam by about one inch. This enables the piano to be raised parallel to the floor while maintaining a balance with respect to the center of gravity of the piano between the beams (from a front to back orientation). As the lifting mechanism raises the piano legs off the floor, the piano is stably supported front to back. Further, careful positioning of the lift and dolly between the sides of the piano combined with a sufficiently long beams (in the widthwise direction of the piano) provides sufficient stability of the piano in the wide-to-side direction as well. Thus, the piano can be moved about by only one person without fear of the piano slipping off the dolly and breaking a piano leg or causing some other type of damage.

The objects of the invention are accomplished by providing a two-part lifting frame. The first part is a base having a generally H-shaped support structure with upstanding posts at each of the outermost corners of the H frame. The corner posts form the first part of a telescoping support for a second frame member, also of H-shaped configuration that has downwardly extending posts of greater dimension than the upstanding posts or vice versa with sufficient close tolerance between the stationary and moving parts to provide a telescoping function. To cause the lifting of the second frame member relative to the first, a hydraulic jack is mounted at the center point of the cross beam of the first H-frame member and is connected to an aligned center point of the cross beam member of the second frame member. By extending the ram of the jack, the second frame member is raised relative to the first. The telescoping post members extend and the legs of the piano are raised off the floor. At the corners of the lower H-frame member are dolly wheels that permit the lift end dolly to be moved around once the legs of the piano are raised off the floor.

Given the structure of the lift, it is essential to maintain an even distribution of weight across the upper H-frame member to prevent binding of the telescoping extension members of the frames. An uneven balance in weight distribution from front to back or side to side will cause the upper frame to tilt relative to the lower frame and thereby bind up the telescoping support of the second frame and prevent further raising of the piano.

By the present invention, the lift is provided with indicators to insure proper positioning of the upper frame member relative to the understructure of the piano to be lifted. There is a slight variation is weight distribution and construction of different pianos, for example Baldwin and Steinway grand pianos. In each case, however, one beam of the upper H-frame member is built up by an additional inch in elevation with respect to the other beam so that the lower of the two can be positioned under the keybed while the built-up or elevated beam member can be positioned under the braces of the piano, which are all generally at the same elevation with respect to the floor. Further, the length of the beam members of the upper H-frame support member is sufficiently long with respect to the width of a grand piano to provide adequate side to side stability for the piano once it is raised off the floor. In this regard, the beam members can extend approximately one-half to the full width of a grand piano to insure such side to side stability. The separation between the beam members engaging the piano does not need to be as great as the length of the beam members in order to provide sufficient front to back support since the one beam member is supporting the piano from under the keybed, to provide the preferred weight distribution.

DETAILED DESCRIPTION OF A PREFERRED EMBODIMENT

Figure 1:
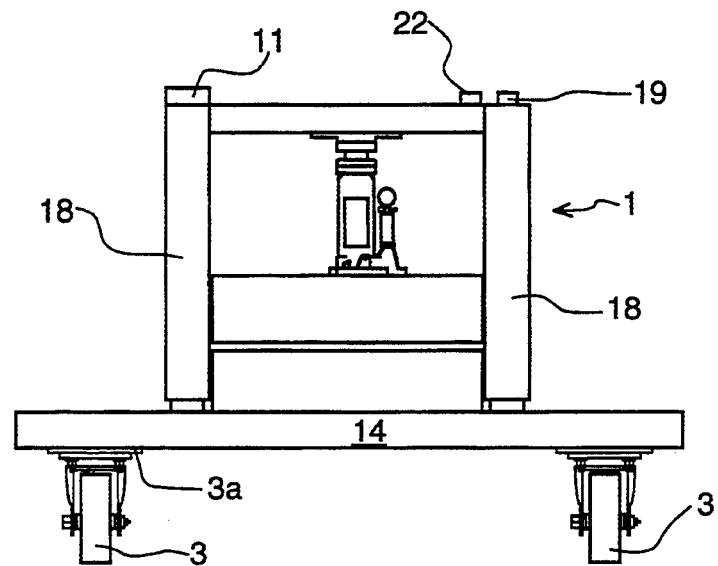
FIG. 1 is a side elevation view of the lifting dolly of the present invention.
Figure 2:
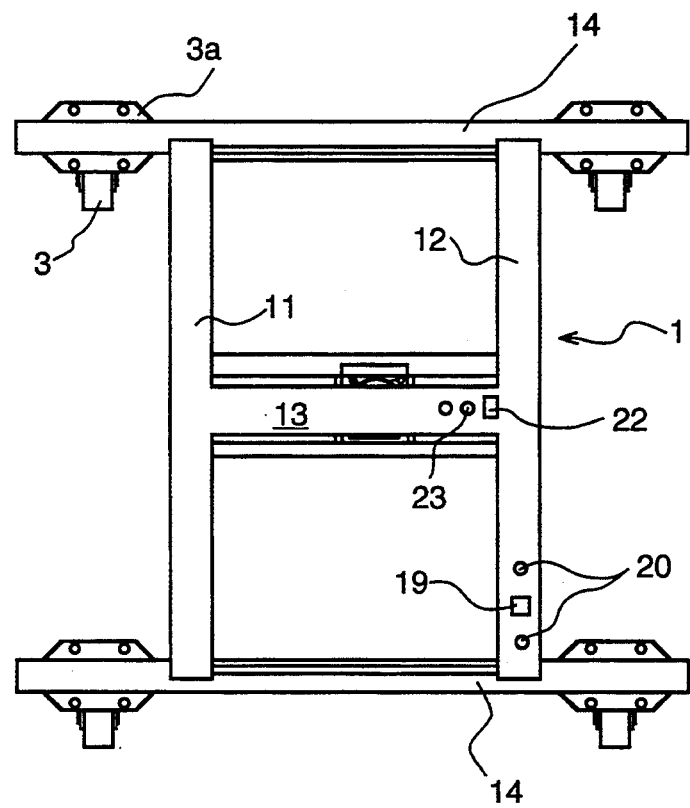
FIG. 2 is a top view of the lift and dolly of the present invention.
Figure 3:
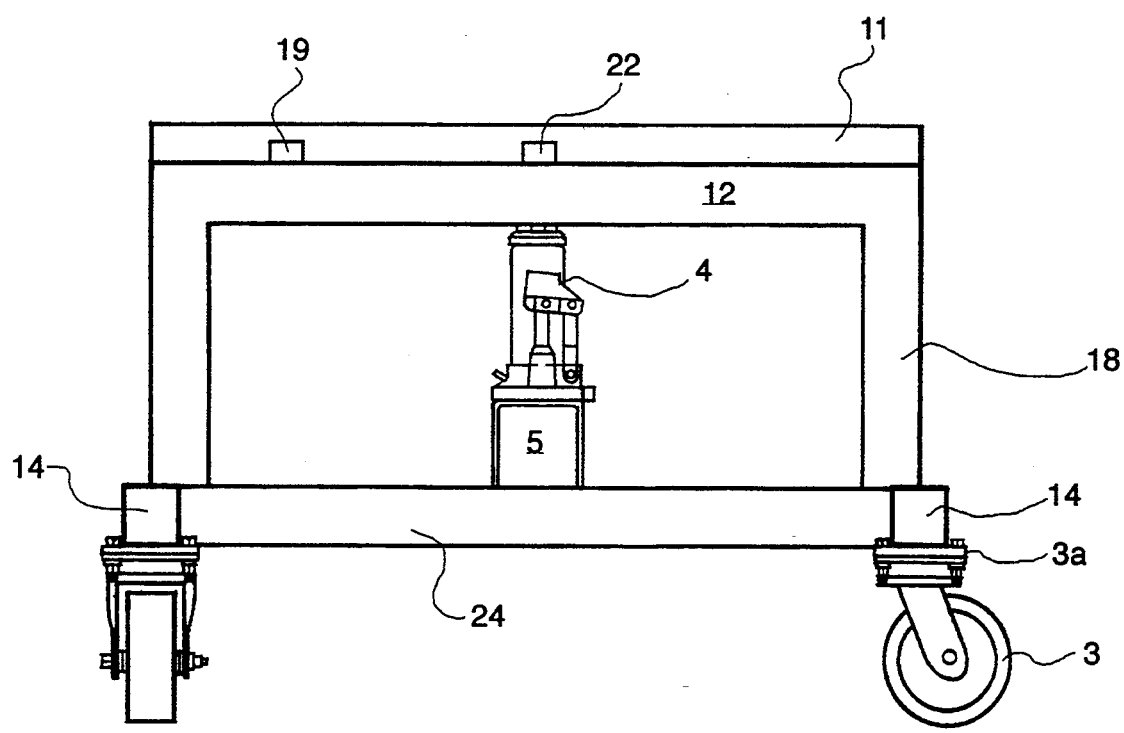
FIG. 3 is a front view of the lift and dolly of the present invention.

FIGS. 1-3 show a preferred embodiment of the lift and dolly of the present invention. The lift portion of the device includes an upper frame member 1 and a lower frame member 2. Wheels 3, which are free to swivel about their respective bases 3a, are mounted on the lower frame members to permit the lift to be movable like a dolly.

Preferably, the frame members 1, 2 are made of steel, such as 2"×2" (nominal) rectangular steel frame tubing. The tubing is welded together to provide strength and rigidity for the frame members. To lift the upper frame member 1 relative to the lower 2, a hydraulic jack 4 is provided, which is supported on a cross beam 5 in the lower frame member 2. The cross beam 5 is preferably a 4"×4" (nominal) rectangular steel frame tubing member that provides an adequate foundation for supporting the base of the hydraulic jack. The jack is extended by using a lever engaged in the actuator sleeve 4 in a known manner.

Figure 4:
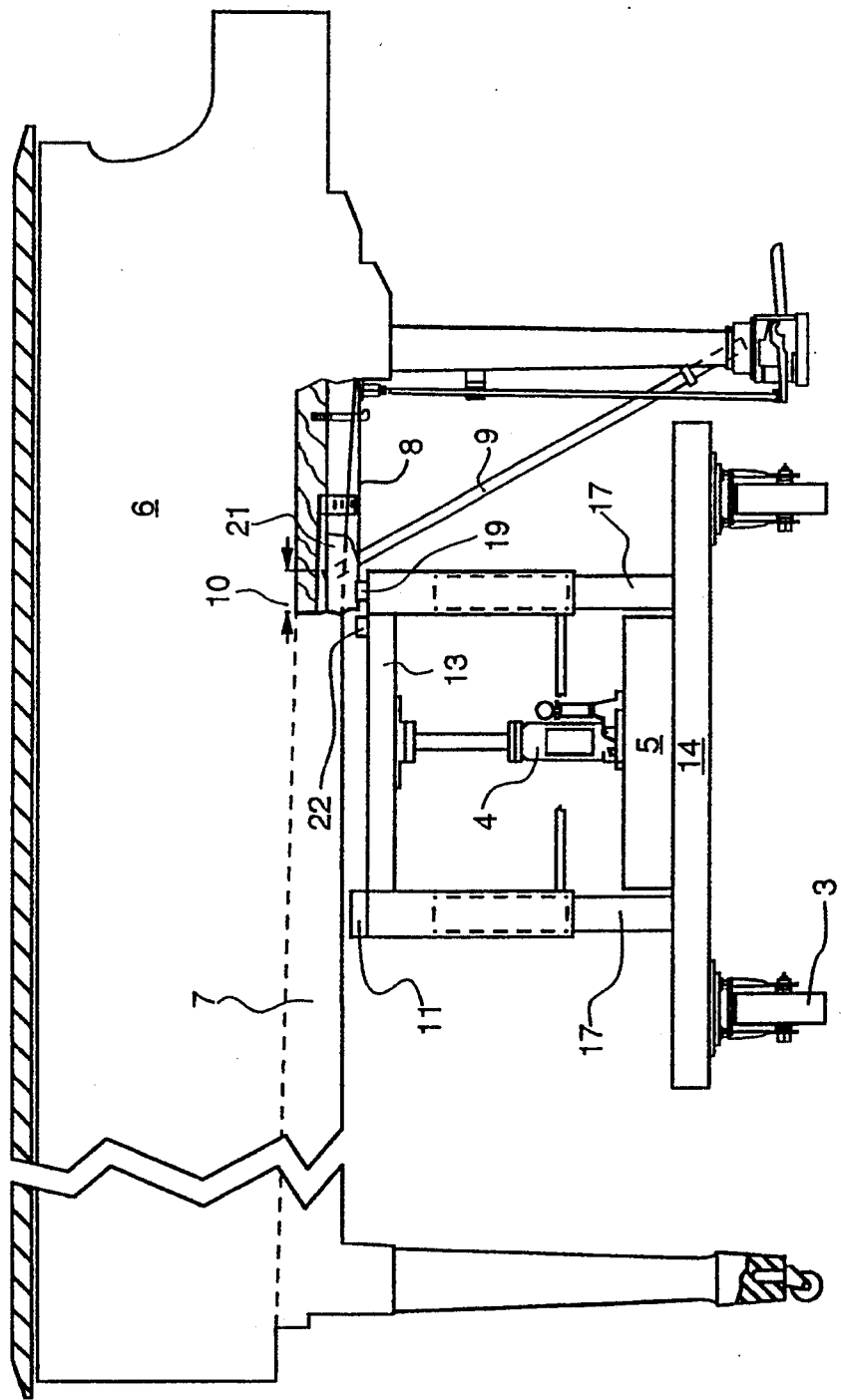
FIG. 4 is a schematic side view of a typical grand piano partially shown in section.

A full grand piano 6 is shown schematically in FIG. 4. Some weigh approximately 1,000 pounds, such as a Baldwin or Steinway grand piano. As a result, the device of the present invention is constructed to withstand heavy loading forces placed on the frame members. Withstanding heavy loading on the frame members, however, is not the only consideration. The weight of the piano must be balanced on the frame members in order to insure smooth lifting and stable transportation of the piano while it is supported on the device. In the use of a Colson dolly, such balance support is achieved by supporting the legs of the piano. In the present invention, however, the lift raises the piano by engaging the structure of the piano underneath it. In order to lift the piano in this manner, however, it must be recognized that the center of gravity of the piano is not at its geometrical mid portion but rather exists closer to the keyboard than to the back of the piano. The reason for this is that the keyboard area of the piano is wider than the back of the piano and is heavier since the piano mechanisms are housed in this area.

As shown in FIG. 4, the piano has braces of all one height from the floor, only one of which is shown, and a forward area that steps down from the braces, which is known as the keybed. Not only is the keybed of a different height off the floor from the rest of the underside of the piano, it also has a lyre stick 9 connected to it. This results in a narrow area 10 running width-wise across the bottom of the keybed that is lift to be used for lifting the piano. This area is not ordinarily used for supporting the piano, however, since it is too close to the lyre stick 9 and it is thought that the risk of damaging the same is too great. Accordingly, the usual method of supporting the piano from underneath is to use a forklift with the tines engaging the piano braces close to the keybed, but not with one of the tines engaging underneath it.

As shown in FIG. 2, the upper frame member 1 comprises an H-shaped frame member having two supporting beams 11, 12 and a cross member 13. Beam 11 is raised with respect to beam 12 by about 1¾ inches, as shown in FIG. 1. According to the method of lifting the piano 6 using the device of the present invention, beam 12 is sufficiently narrow to be positioned under the keybed in area 10 rearward of the connection point of the lyre stick 9 so that no interference with the lyre stick 9 is risked. Preferably, the beam 12 is approximately 2" (nominal) wide. This permits beam 12 to be used with a plurality of different pianos, each having approximately the same dimension of free space 10 along the keybed rearward of the lyre stick 9. The difference in height between the keybed and the rest of the underside of the piano braces 7 that are engaged by the beam 11 is about 1¾". Thus, beam 11 is stepped up in height by this amount, as shown in FIG. 1. This can be accomplished by adding an additional frame member on the beam 11, according to a preferred embodiment of the invention.

The lower frame member 2 also has an H-shaped frame portion with two beams 24, only one of which is shown in FIG. 3, and two additional cross members 14. The wheel bases 3a are mounted on the outer ends of each of the cross members 14. Center cross beam member 5 is preferably wider than the other members 14 for supporting the base of the hydraulic jack 4.

At the junction of the H-frame member portion of the lower frame member 1 and the upper and lower cross beam members, are welded upright posts 17, shown partially in FIGS. 1 and 3. To provide a telescoping connection of the lower frame member 1 to the upper frame member 2, the upper frame member 3 has vertically aligned tube members 18 that fit over the posts 17. The inner dimension of the tube members 18 is slightly greater than the outer dimension of the posts so that a clearance is provided to permit the telescoping function.

According to the preferred embodiment, the telescoping tube and post members provide the lifting support of the piano. Accordingly, whereas a small amount of play is permitted when the piano is supported, unequal weight distribution across the upper frame member will result in binding of the telescoping members. Thus, according to the present invention, the lift and dolly are positioned under the piano to permit equal distribution across the upper frame member once the piano is lifted. To ensure this, the piano can be marked by tape, for example, and the lift likewise marked on beam 12. The marks for alignment for the upper frame member with respect to the piano, and particularly the keybed of the piano are different for the different makes of piano.

In a preferred embodiment of the present invention, the beam 12 has an indicator 19 that is adjustable through engagement of one of the holes 20 in the beam. Indicator 19 can be a square stop with a peg or hitch pin 10 for engaging the holes 20, which are positioned in predetermined locations in accordance with various known makes of pianos. Indicator 19 is positioned to engage a side edge 21 of the keybed 8 to accomplish quick positioning of the lift and dolly device from a side-to-side perspective. Similarly, to position the beam 12 underneath the keybed, an indicator 22, such as a stop is positioned on the crossmember 13 in one of the positioning holes 23. By use of indicators 19 and 22, the lift and dolly can be quickly positioned underneath a piano for balanced lifting of the piano.

Although a preferred embodiment of the invention has been described in the foregoing specification and with reference to the accompanying drawings, the invention is defined by the following claims.

What is claimed is:

1. A piano lift and dolly for grand pianos, comprising:
   a first lower frame supported on wheels, and including four vertically extending upright posts;
   a second upper frame for engaging the piano and including a tube for each of the upright posts of the lower frame wherein each post and tube combination provides a telescopic joint extending vertically;
   a centrally disposed jack having a base and extendible ram, wherein the base is fixed to the lower frame and the ram is fixed to the upper frame for vertically raising the upper frame member with respect to the lower frame member without intermediate linkages;
   said upper frame member having at least two supporting means comprising first and second beams spaced apart from one another, wherein a surface of said first beam is lower in vertical height than a surface of said second beam with respect to a floor such that said first beam surface is engageable with a rearward portion of a keybed of a grand piano and said second beam surface is engageable with an underside portion of braces of the piano spaced rearwardly from the keybed, wherein:
   said lower frame is a lower H-frame having a first cross member with a first center point and third and fourth beams, said hydraulic jack being supported at said first center point;
   said four upright posts extend, respectively, from end portions of said third and fourth lower H-frame beams;
   and wherein said first and second beams of said upper frame member are part of an upper H-frame construction that has a second cross member extending between said beams in alignment with said first cross member and having a second center point aligned with said first center point, said ram of said jack being fixed directly to said second center point of said second cross beam so that as said ram extends, said upper H-frame moves a vertical distance with respect to said lower H-frame equal to the extension distance of said ram and a lifting force of said upper H-frame with respect to said lower H-frame is generated along a line extending between said center points, said tubes extend respectively from end portions of said first and second beams.

2. A lift and dolly as claimed in claim 1, wherein said beams of said upper H-frame are parallel and wherein said first beam has a width of a dimension of the keybed rearward of a lyre stick connection point wherein said top surface of said second beam is a first top surface and is greater in height than said surface of said first beam which is a second top surface by approximately 1″ with respect to a floor supporting the dolly.

3. A lift and dolly according to claim 1, wherein said first beam member of said upper H-frame has an adjustable indicator means for positioning said lift and dolly side-to-side underneath the piano, said indicator means being engageable with a side edge of the keybed of the piano to be lifted.

4. A lift and dolly according to claim 3, further including an indicator member connected to said second cross member for engagement with a rearward edge of the keybed, said indicating member connected by adjustment means for movement along said second cross member in accordance with the make of piano to be lifted.

* * * * *